(12) United States Patent
Chen et al.

(10) Patent No.: US 12,341,185 B2
(45) Date of Patent: Jun. 24, 2025

(54) AQUEOUS ZINC LITHIUM-ION BATTERY AND METHOD FOR MAKING SAME

(71) Applicants: Janak Handa, Waterloo (CA); Zhongwei Chen, Waterloo (CA)

(72) Inventors: Zhongwei Chen, Waterloo (CA); Ali Ghorbani Kashkooli, Waterloo (CA); Sepehr Khazraei, Waterloo (CA)

(73) Assignees: Janak H. Handa, Toronto (CA); Zhongwei Chen, Waterloo (CA)

( * ) Notice: Subject to any disclaimer, the term of this patent is extended or adjusted under 35 U.S.C. 154(b) by 1003 days.

(21) Appl. No.: 17/267,390

(22) PCT Filed: Aug. 9, 2019

(86) PCT No.: PCT/CA2019/051096
§ 371 (c)(1),
(2) Date: Feb. 9, 2021

(87) PCT Pub. No.: WO2020/061677
PCT Pub. Date: Apr. 2, 2020

(65) Prior Publication Data
US 2021/0296634 A1  Sep. 23, 2021

Related U.S. Application Data

(60) Provisional application No. 62/716,594, filed on Aug. 9, 2018.

(51) Int. Cl.
| | | |
|---|---|---|
| *H01M 4/42* | (2006.01) |
| *H01M 4/04* | (2006.01) |
| *H01M 4/131* | (2010.01) |
| *H01M 4/136* | (2010.01) |
| *H01M 4/1391* | (2010.01) |
| *H01M 4/1397* | (2010.01) |
| *H01M 4/38* | (2006.01) |

(Continued)

(52) U.S. Cl.
CPC .......... *H01M 4/136* (2013.01); *H01M 4/0404* (2013.01); *H01M 4/0471* (2013.01); *H01M 4/131* (2013.01); *H01M 4/1391* (2013.01); *H01M 4/1397* (2013.01); *H01M 4/38* (2013.01); *H01M 4/505* (2013.01); *H01M 4/5825* (2013.01); *H01M 4/661* (2013.01); *H01M 4/663* (2013.01); *H01M 4/74* (2013.01); *H01M 10/36* (2013.01); *H01M 2004/021* (2013.01)

(58) Field of Classification Search
None
See application file for complete search history.

(56) References Cited

U.S. PATENT DOCUMENTS

2011/0045346 A1* 2/2011 Chiang ............... H01G 11/56
429/231.95

FOREIGN PATENT DOCUMENTS

| CN | 106207253 | * 12/2016 | ........ H01M 10/0525 |
| CN | 106299494 | *  1/2017 | ............ H01M 10/38 |

OTHER PUBLICATIONS

English translation of CN106299494 (Year: 2017).*

(Continued)

*Primary Examiner* — Yoshitoshi Takeuchi
(74) *Attorney, Agent, or Firm* — Aird & McBurney LP

(57) ABSTRACT

A battery cell and method for manufacturing the same are provided. The battery cell includes a binder-free dough-like cathode separated from a sponge zinc anode by a separator and a hybrid aqueous electrolyte.

9 Claims, 3 Drawing Sheets

Figure 1:
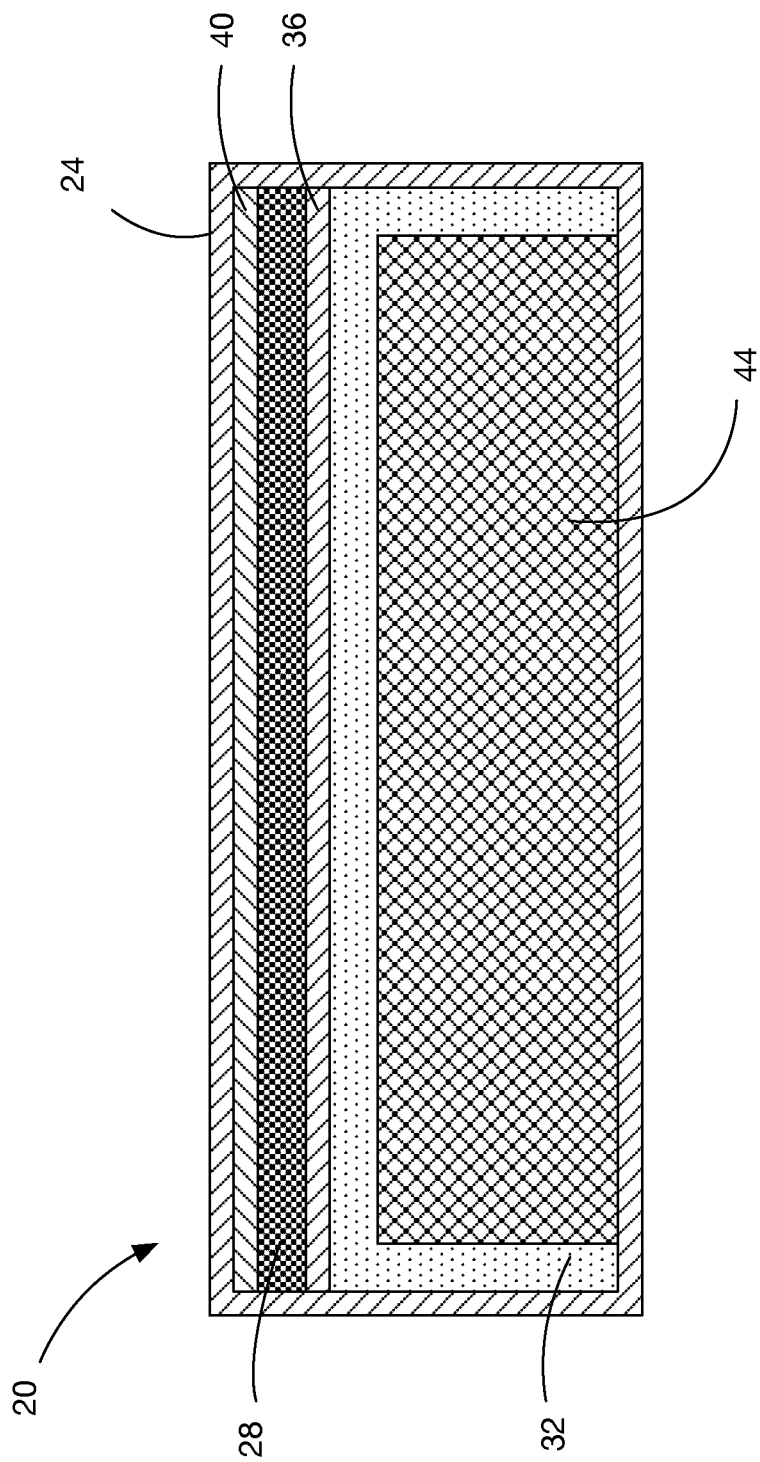

(51) Int. Cl.
  *H01M 4/505* (2010.01)
  *H01M 4/52* (2010.01)
  *H01M 4/525* (2010.01)
  *H01M 4/58* (2010.01)
  *H01M 4/66* (2006.01)
  *H01M 4/74* (2006.01)
  *H01M 10/36* (2010.01)
  *H01M 4/02* (2006.01)

(56) References Cited

OTHER PUBLICATIONS

English translation of CN 106207253 (Year: 2016).*
Yan et al, Rechargeable hybrid aqueous batteries, 216 J. Power Sources, 222-226 (2012) (Year: 2012).*

* cited by examiner

AQUEOUS ZINC LITHIUM-ION BATTERY AND METHOD FOR MAKING SAME

FIELD

The specification relates generally to energy storage and, in particular, to an aqueous zinc lithium-ion battery and a method for making the same.

BACKGROUND OF THE DISCLOSURE

WO2012094761A1 discloses a secondary aqueous zinc lithium-ion ("Li-ion") battery that utilizes a lithium intercalation compound as a cathode active material, a zinc metal as an anode active material, a hybrid aqueous solution with $Li^+$ and $Zn^{2+}$ as the electrolyte. The working concept of a zinc Li-ion battery is based on ion-exchange in an electrolyte. During battery charging, lithium ions de-intercalate from the cathode active material and dissolve into the electrolyte. At the same time, zinc ions in the electrolyte are reduced to zinc metal and deposited onto an anode surface. During discharge, the reverse process occurs.

Zinc Li-ion batteries exhibit excellent cycling stability and reasonable energy density, and potentially are an alternative to lead acid batteries in some application areas that require long lifespan and low cost.

In the practice of cathode manufacturing, the same general process is utilized for zinc Li-ion batteries as for conventional Li-ion batteries. In recent years, the manufacturing technology for Li-ion batteries has been improved.

In battery manufacturing, there are some common challenges for conventional electrode design. The coating thickness of the electrode is normally less than 100 micrometers due to certain performance and manufacturing limitations. From a performance perspective, electrodes that possess a thickness of over 100 micrometers typically have significant reductions in their rate capability; while in terms of manufacturing, capillary forces during the drying process lead to crack formation inside of the thick electrodes.

Additionally, thicker electrodes lead to a higher energy density but lower rate capability. In other words, energy density is generally inversely related to rate capability.

Further, the polymer binder used in conventional electrodes can obstruct the pore structure of the electrodes and grows tortuously, which thereby increases the resistance.

US20140170524A1 disclosed a semi-solid Li-ion battery utilizing binder-free electrodes in an organic liquid electrolyte. The thickness of this binder-free semi-solid electrode can be up to 2 mm, and the electrode still retained good rate capability.

For aqueous Li-ion batteries, zincs can be utilized due to abundant resources, high specific capacity and high output voltage compared to other metals like iron and nickel. However, its utilization is limited due to some chemical and electrochemical reaction during cycling. Conventional zinc metals consisting of zinc powder, a gelling agent, and binders. During discharging of zinc Li-ion batteries, the metallic zinc is oxidized, and zinc ions generate and dissolves in the electrolyte.

During the charging of zinc Li-ion batteries, the Li-ions de-intercalated from the cathode. In the other side, $Zn^{2+}$ gains electrons and deposits on the zinc metal surface. Uneven deposition of $Zn^{2+}$ on the surface of zinc metals during extended cycling forms a needle-like structure called dendrite formation which can fatally short circuit the battery. These dendrite formations hinder the application of zinc metals in aqueous zinc Li-ion batteries for long-term cyclic behavior. To improve the durability and eliminate some detrimental dendrite formation, the conventional zinc metals used in such batteries are replaced with new redesigned zinc metals.

US20140147757A1 disclosed a highly porous 3D sponge zinc form factor which suppressed dendrite formation during extended cycling and addressed inefficient zinc utilization. This sponge form factor zinc can deeply discharge and uniformly deposit during charging which showed promise as an electrode for thousands of cycles in nickel-3D zinc battery.

SUMMARY OF THE DISCLOSURE

In one aspect, there is provided a battery cell, comprising a binder-free dough-like cathode separated from a sponge zinc anode by a separator and a hybrid aqueous electrolyte.

The binder-free dough-like cathode can be a condensed slurry of Li-ion intercalation compounds and conductive carbon in a hybrid aqueous electrolyte. The binder-free dough-like cathode can be carried by a flexible graphite foil as a current collector. The Li-ion interaction compounds can be selected from the group consisting of $LiMn_2O_4$, $LiFePO_4$, $LiCoO_2$, and $LiCo_xNi_yMn_zO_2$ (x+y+z=1).

The binder-free dough-like cathode can include 70 to 95 wt. % active material, and 5 to 30 wt. % conductive agent as a solid phase dispersed in a hybrid aqueous electrolyte.

The binder-free dough-like cathode can have a thickness in the range of 200 micrometers to 2000 micrometers.

The sponge zinc anode can surround a copper mesh that acts as a current collector.

The hybrid aqueous electrolyte can be a hybrid of $Li^+$ ions and $Zn^{2+}$ ions.

According to another aspect, there is provided a method of manufacturing a battery cell, comprising separating a binder-free dough-like cathode and a sponge zinc anode with a separator and a hybrid aqueous electrolyte.

The method can further include making the binder-free dough-like cathode with a condensed slurry of Li-ion intercalation compounds and conductive carbon in a hybrid aqueous electrolyte. The binder-free dough-like cathode can be carried by a flexible graphite foil as a current collector. The Li-ion interaction compounds can be selected from the group consisting of $LiMn_2O_4$, $LiFePO_4$, $LiCoO_2$, and $LiCo_xNi_yMn_zO_2$ (x+y+z=1).

The method can further include roll-pressing the binder-free dough-like cathode to achieve a desired thickness.

The method can further include casting an emulsion of a zinc powder on a copper mesh that acts as a current collector to form the sponge zinc anode. The emulsion on the copper mesh can be sintered in a tube furnace under flowing argon.

The method can further include making the anode from an emulsion of zinc powder in a liquid phase. The liquid phase can be a mixture of water and decane.

In a further aspect, there is provided a battery cell, comprising a binder-free cathode that includes 70 to 95 wt. % active material, and 5 to 30 wt. % conductive agent as a solid phase dispersed in a hybrid aqueous electrolyte, a sponge zinc anode, and a hybrid aqueous electrolyte and a separator separating the cathode from the sponge zinc anode.

BRIEF DESCRIPTIONS OF THE DRAWINGS

Figure 2:
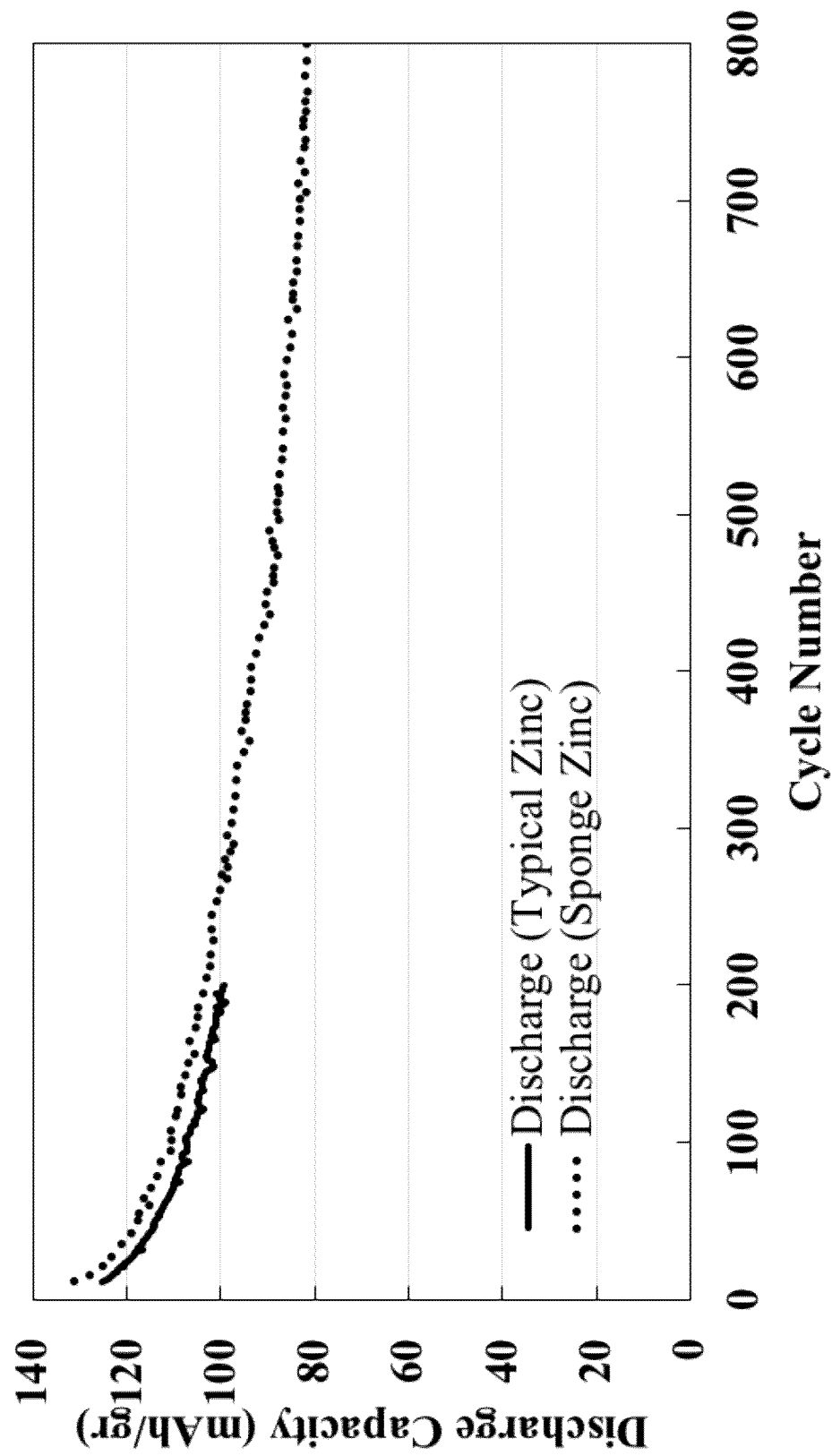
Figure 3:
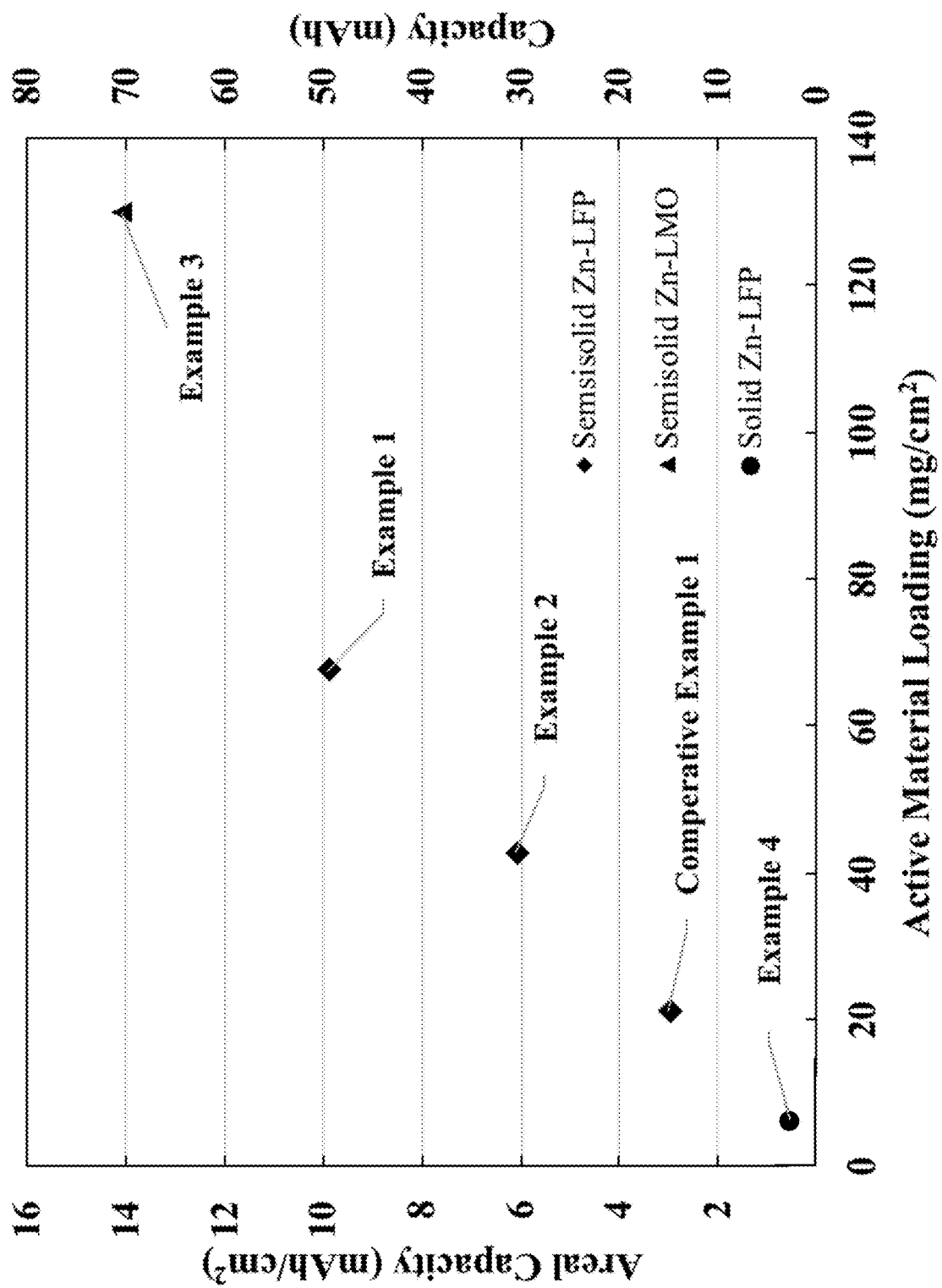

For a better understanding of the various embodiments described herein and to show more clearly how they may be carried into effect, reference will now be made, by way of example only, to the accompanying drawings in which:

FIG. 1 is a schematic diagram of an aqueous zinc Li-ion battery in accordance with an embodiment;

FIG. 2 is a graph of the discharge capacity of the zinc Li-ion cell according to comparative examples 1 and 2 versus the cycle number; and FIG. 3 is a comparison of areal capacity for the zinc Li-ion cell according to examples 1 to 4 at different thicknesses and active material loading.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The present invention relates to the field electrochemical energy conversion and storage devices and its applications for grid energy storage systems, hybrid and electric vehicles, and portable electronic devices.

FIG. 1 shows a secondary aqueous zinc Li-ion battery cell 20 in accordance with an embodiment. The aqueous zinc Li-ion zinc battery 20 has a casing 24 that is suitable for housing zinc, Li-ion, and an aqueous electrolyte. A cathode 28 is positioned in the casing 24. The cathode 28 is a binder-free electrode structure of a dough-like mixture of an active material and a conductive material in an aqueous electrolyte.

The dough-like cathode 28 comprised of Li-ion active material (70 to 95 wt. %) and conductive agent (5 to 30 wt. %) as the solid phase, and the electrolyte as liquid phase. For example, the dough-like mixture can be a condensed mixture of lithium intercalation compounds such as $LiFePO_4$, $LiMn_2O_4$, $LiCoO_2$, $LiCo_xNi_yMn_zO_2$ (x+y+z=1), and conductive carbon like carbon Super P or acetylene black which is dispersed in a hybrid aqueous solution of $Li^+$ and $Zn^{2+}$. The solids are dispersed into the electrolyte (liquid phase) using mixing equipment such as planetary mixer or centrifugal mixer. The mixing process is typically conducted at high speed (10000 rpm or more) for at least 10 mins. The final dough-like electrode has the portion of 35-70 wt. % electrolyte, and 30-65 wt. % solid phase. The solid/liquid ratio depends on the active material and conductive agent particle size. The dough-like cathode after mixing will have a paste consistency without any sign of flowing. The apparent viscosity can be in the range of 10,000 to 2,000,000 centipoises (10-2,000 Pascal-seconds) at room temperature.

The dough-like cathode 28 is carried by a flexible graphite foil as a cathode current collector 40. The dough-like cathode 28 can be coated on the surface of the graphite foil by using rolling press machine at desired thickness. The cathode 28 can be fabricated in different ranges of thicknesses from 200 micrometers up to 2000 micrometers or even greater for a high energy density application. In the present embodiment, the cathode 28 is roll pressed to achieve the desired thickness. The dough-like cathode 28 is adhesive, flexible and can easily be attached to the graphite foil with easy handling during the fabrication of the battery cell 20. While graphite foil is used as the substrate to provide the cathode current collector 40 in the present embodiment, the dough-like cathode 28 can be applied to other types of substrates such as nickel foam, stainless steel mesh, and graphite felt in other embodiments.

The aqueous electrolyte used in the dough-like mixture of the cathode 28 is, in this embodiment, the same as the aqueous electrolyte. In other embodiments, however, the aqueous electrolyte used in the dough-like mixture of the cathode 28 can differ from the aqueous electrolyte used, for example, in terms of the concentration of salts.

An anode 32 is positioned in the casing 24 and separated from the cathode 28 via an ion-permeable separator 36. The anode 32 is a sponge form factor zinc. The sponge form factor zinc has a highly porous three-dimensional architecture which can be deeply discharged and exhibits little or no dendrite growth at extended cycling when coupled with Li-ion cathodes, such as the cathode 28, in secondary aqueous batteries for high-durability performance. The anode 32 is a highly porous fused monolithic electrode structure surrounding a copper mesh 44 that acts as an anode current collector.

The ion-permeable separator 36 can be, for example, absorbed glass mat (AGM).

Further, the electrolyte employed is a hybrid aqueous solution of $Li^+$ and $Zn^{2+}$ that is absorbed by the ion-permeable separator 36.

The battery cell 20 can be used as a battery or, alternatively, can be coupled to other battery cells to form a battery.

In some scenarios, the energy density of the aqueous zinc Li-ion battery cell 20 can be increased by use of an ultra-thick cathode, significantly simplifying the manufacturing process, reducing the cost of an aqueous zinc Li-ion battery, and improving durability of the battery by use of the porous sponge zinc. The aqueous electrolyte is more cost-effective compared to organic electrolytes, as well as being safer than the highly toxic and flammable organic electrolyte. Further, less separators can be employed. The use of zinc in the battery cell 20 makes it safe to operate, in contrast to lithium-based batteries, which are susceptible to combustion and/or explosion.

The secondary aqueous zinc Li-ion electrochemical battery cell 20 is based on the ion exchange concept. It utilizes lithium intercalation compounds as a cathode active material, porous zinc as an anode active material, a hybrid aqueous solution of Lit, and $Zn^{2+}$ as an electrolyte. During charging of the battery cell 20, lithium ions de-intercalate from the framework of cathode active material particles and dissolve into the electrolyte. At the same time, zinc ions in the electrolyte are reduced to zinc metal and deposit onto the copper mesh 44. During discharging, lithium ions intercalate to the framework of the active material of the cathode 28 and zinc ions are oxidized and dissolved in the electrolyte.

The binder-free dough-like cathode 28 is made of lithium intercalation compounds and conductive carbon in a hybrid aqueous solution of $Li^+$ and $Zn^{2+}$. Compared to a semi-solid electrode in an organic electrolyte, the dough-like cathode 28 has much higher metallic strength because the aqueous electrolyte possesses much higher surface tension.

The dough-like cathode 28 is a condensed slurry of solid particles dispersed in an aqueous electrolyte, the solid phase of which includes an active material and a conductive agent. The solid mixture is fully ground and, subsequently, the hybrid aqueous electrolyte of $Li^+$ and $Zn^{2+}$ is added to the solid mixture to provide a dough-like consistency.

Since the aqueous electrolyte is typically weakly acidic, the cathode current collector 40 has to be acid resistant. A carbon-based material such as flexible graphite foil can be used due to its acidic resistance.

The electrolyte in the electrode structure promotes ion conductivity and provides more available Li-ion specifically for thick electrode design during Li-ion depletion in the electrolyte. The dough-like cathode 28 has a thickness in the range of 200 micrometers up to 2000 micrometers or even greater.

The dough-like cathode 28 can be fabricated by any suitable calendaring process such as via a rolling process with or without substrate. Compared to the manufacturing process of a conventional Li-ion battery, the fabrication of the electrode can be, in some cases, less complex, lower cost, less equipment-reliant, and safer. In the process of manufacturing the battery cell 20, aqueous processing is replaced with solvent processing of conventional electrodes which enables the omission of the step of drying and solvent recovery that is needed in the fabrication process of Li-ion batteries.

In a preferred embodiment, the conductive carbon of the cathode 28 contains 5-30 wt. % of solid phase, which has found to be effective for increasing the metallic strength and conductivity of the cathode 28, and the active material contains 70-95 wt. % of the solid weight, which is found to be effective for high energy density application as the active material loading is increased. The electrolyte could be a hybrid aqueous solution of $Li^+$ and $Zn^{2+}$, such as a hybrid solution of $ZnSO_4$ and $Li_2SO_4$. In a preferred embodiment, the electrolyte can be added to the solid phase in the ratio between 0.5 to 3 of electrolyte weight to solid weight. The dough-like cathode 28 is free from any binder in the structure and, as a result, facilitates the conductivity of the electrode by reducing tortuosity and enables the allocation of more space for the active material and the conductive agent.

The anode 32 is provided by an emulsion of zinc powder in a liquid phase. In a preferred embodiment, the liquid phase can be a mixture of water and decane. The porous sponge zinc of the anode 32 was prepared by a mixture of zinc powder, an emulsion stabilizer like carboxymethyl cellulose, and an emulsifier like sodium dodecyl sulfate which were stirred in a mixture of water and decane. Other emulsion additives like indium and bismuth can be added to reduce corrosion of the sponge zinc and gas evolution. The resultant emulsion was cast on the copper mesh 44 to increase conductivity and void space. The resultant coated zinc on the copper mesh 44, after drying in air overnight, is sintered in a tube furnace under flowing argon to interconnect the fused zinc. To increase the strength of the zinc, the tube was opened to static air and the temperature is increased to far above the melting point of zinc to form a robust and monolithic porous zinc. This structure includes the Zn/ZnO particles and void spaces defining the sponge zinc. The ZnO can be reduced to Zn by electrochemical redox reaction. This porous structure allows uniform current distribution and each depth of the zinc structure retains its form with little dendrite growth during extended cycling.

The secondary aqueous zinc Li-ion electrochemical cell is fabricated with a dough-like cathode 28 carried by a flexible graphite foil acting as the cathode current collector 40, a sponge porous zinc as the anode 32 in the middle of which is the copper mesh 44 acting as the anode current collector, and an appropriate separator 36 like AGM between the anode 32 and the cathode 28, which was previously soaked in a hybrid aqueous electrolyte of $Li^+$ and $Zn^{2+}$. The secondary aqueous zinc Li-ion battery cell 20 is capable, in various scenarios, of operating to at least one thousand charge cycles with the binder-free thick electrode design and high areal capacity.

Comparative Example 1

In a first comparative example, a zinc Li-ion battery cell was prepared using a binder-free dough-like cathode and a typical zinc metal anode was charged and discharged at 1 $mA \cdot cm^{-2}$ as shown in FIG. 2. The binder-free dough-like cathode was prepared by mixing $LiFePO_4$ and Carbon Super P (70:30 by wt. %) with a hybrid aqueous solution of 3 M $Li_2SO_4$ and 4 M $ZnSO_4$, the weight ratio of solid to liquid being 1:2.1. The condensed slurry of the cathode was prepared using a planetary centrifugal mixer at 1000 rpm for 10 minutes, and then rolled onto a graphite foil (200 micrometer thickness). The thickness of the cathode was 700 micrometers.

The cell was assembled with the piece of cathode, copper foil, and an AGM separator, and a hybrid aqueous solution of 3 M $Li_2SO_4$ and 4 M $ZnSO_4$ was used as an electrolyte that was absorbed by the AGM separator.

The electrochemical cell worked for about 200 cycles. The zinc dendrite growth on the zinc surface caused the battery to terminate operation after about 200 cycles and short-circuit the battery.

Comparative Example 2

In a second comparative example, a zinc Li-ion cell was prepared using a binder-free dough-like cathode and a sponge zinc anode was charged and discharged at 1 $mA \cdot cm^{-2}$ as shown in FIG. 2. The binder-free dough-like cathode was prepared by mixing $LiFePO_4$ and Carbon Super P (70:30 by wt. %) with a hybrid aqueous solution of 3 M $Li_2SO_4$ and 4 M $ZnSO_4$, the weight ratio of solid to liquid being 1:2.1. The condensed slurry of the cathode was prepared using a planetary centrifugal mixer at 1000 rpm for 10 minutes, and then rolled onto a graphite foil (200 micrometers thickness). The thickness of the cathode was 700 micrometers.

The cell was assembled with the piece of cathode, copper foil and AGM separator, and a hybrid aqueous solution of 3 M $Li_2SO_4$ and 4 M $ZnSO_4$ was used as an electrolyte that was absorbed by the AGM separator.

The electrochemical cell worked for more than 800 cycles which showed much better durability compared to a zinc Li-ion battery with conventional zinc metal in Example 1 above. As expected, the successful replacement of porous sponge zinc instead of typical zinc anode reduced the zinc dendrite growth and extended the durability of the battery.

Example 1

In a first example implementation, a zinc Li-ion cell was prepared using a binder-free dough-like cathode and a zinc anode. The binder-free dough-like cathode was prepared by mixing $LiFePO_4$ and Carbon Super P (95:5 by wt. %) with a hybrid aqueous solution of 3 M $Li_2SO_4$ and 4 M $ZnSO_4$, the weight ratio of solid to liquid being 2:3. The condensed slurry of the cathode was prepared using a planetary centrifugal mixer at 1000 rpm for 10 minutes, and then rolled onto a graphite foil (200 micrometer thickness). The thickness of the cathode was 1000 micrometers. The battery was tested at 1 $mA \cdot cm^{-2}$ current density. The battery showed high active material loading of 67.5 $mg \cdot cm^{-2}$, and great areal capacity of 9.9 $mA \cdot cm^{-2}$.

A cell was assembled with the piece of cathode, copper foil and AGM separator, and a hybrid aqueous solution of 3M $Li_2SO_4$ and 4M $ZnSO_4$ was used as an electrolyte that was absorbed by the AGM separator.

Example 2

In a second example implementation, a zinc Li-ion cell was prepared using a binder-free dough-like cathode and a zinc anode. The binder-free dough-like cathode was prepared by mixing $LiFePO_4$ and acetylene black (90:10 by wt. %) with a hybrid aqueous solution of 1.0 M $Li_2SO_4$ and 1.5 M $ZnSO_4$, the weight ratio of solid to liquid being 2.2:3. The condensed slurry of the cathode was prepared using a planetary centrifugal mixer at 1000 rpm for 10 minutes, and then rolled onto a graphite foil (200 micrometer thickness). The total thickness of the cathode was 700 micrometers. The battery was tested at 1 $mA \cdot cm^{-2}$ current density.

The cell was assembled with the piece of cathode, copper foil and AGM separator, and a hybrid aqueous solution of 1.0 M $Li_2SO_4$ and 1.5 M $ZnSO_4$ was used as an electrolyte that was absorbed by the AGM separator.

Example 3

In a third example implementation, a zinc Li-ion cell was prepared using a binder-free dough-like cathode and a zinc anode. The binder-free dough-like cathode was prepared by mixing $LiMn_2O_4$ and Carbon Super P (90:10 by wt. %) with a hybrid aqueous solution of 2.0 M LiCl and 2 M $ZnCl_2$, the weight ratio of solid to liquid being 1:1. The condensed slurry of the cathode was prepared using a planetary centrifugal mixer at 1000 rpm for 10 minutes, and then rolled onto a graphite foil (200 micrometer thickness). The total thickness of the cathode was 1000 micrometers. The battery was tested at 1 $mA \cdot cm^{-2}$ current density. The battery showed high active material loading of 129.8 $mg \cdot cm^{-2}$, and great areal capacity of 14.1 $mA \cdot cm^{-2}$.

The cell was assembled with the piece of cathode, copper foil and AGM separator, and a hybrid aqueous solution of 2.0 M LiCl and 2 M $ZnCl_2$ was used as an electrolyte that was absorbed by the AGM separator.

Example 4

In a fourth example implementation, a zinc Li-ion cell was prepared using a conventional solid cathode and a zinc foil anode. The solid cathode was prepared by dissolving $LiFePO_4$, Carbon Super P and Polyvinylidene fluoride (85: 7:8 by wt. %) in N-Methyl-2-pyrrolidone solvent, followed by coating on the graphite foil by using Dr. Blade. The cathode was dried in vacuum oven overnight to evaporate organic solvent. The thickness of the cathode was 100 micrometers. The battery was tested at 1 $mA \cdot cm^{-2}$ current density.

The cell was assembled with a piece of cathode, copper foil and AGM separator, and a hybrid aqueous solution of 2.0 M $Li_2SO_4$ and 3.0 M $ZnSO_4$ was used as an electrolyte that was absorbed by the AGM separator.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. An aqueous rechargeable zinc Li-ion battery cell, comprising:
    a binder-free, dough-like flexible cathode that includes 70 to 95 wt. % reversible Li-ion intercalation/deintercalation active material and 5 to 30 wt. % conductive agent as a solid phase dispersed in a neutral or weakly acidic hybrid aqueous electrolyte that includes an aqueous solution of $Zn^{2+}$ and $Li^+$ salts, wherein the Li-ion intercalation compound is selected from the group consisting of $LiMn_2O_4$, $LiFePO_4$, $LiCoO_2$, $LiCo_xNi_yMn_zO_2$ (x+y+z=1);
    a porous and robust sponge zinc anode; and
    wherein the cathode is separated from the anode by a separator and an aqueous electrolyte in the separator,
    wherein the cathode has a thickness in the range of 700 micrometers to 2000 micrometers.

2. The aqueous rechargeable zinc Li-ion battery cell as claimed in claim 1, further comprising a cathode current collector in contact with the cathode, wherein the cathode current collector comprises a flexible graphite foil.

3. The aqueous rechargeable zinc Li-ion battery cell as claimed in claim 1, further comprising an anode current collector in contact with the anode, wherein the anode current collector is in the form of a mesh.

4. The aqueous rechargeable zinc Li-ion battery cell as claimed in claim 3, wherein the mesh is a copper mesh.

5. The aqueous rechargeable zinc Li-ion battery cell as claimed in claim 1, wherein the aqueous electrolyte in the separator is the same as the hybrid aqueous electrolyte of the cathode.

6. The aqueous rechargeable zinc Li-ion battery cell as claimed in claim 1, wherein the thickness of the cathode is at least 1000 micrometers.

7. The aqueous rechargeable zinc Li-ion battery cell as claimed in claim 1, wherein the conductive agent comprises conductive carbon.

8. The aqueous rechargeable zinc Li-ion battery cell as claimed in claim 1, wherein the cathode includes 30-65 wt. % of the solid phase, and 35-70 wt. % of the hybrid aqueous electrolyte.

9. The aqueous rechargeable zinc Li-ion battery cell as claimed in claim 1, wherein the cathode has a viscosity of 10 to 2000 Pascal-seconds at room temperature.

* * * * *